Feb. 3, 1948.     S. P. F. OGREN     2,435,321
MACHINE TOOL
Filed Dec. 23, 1944     5 Sheets-Sheet 1

INVENTOR.
Sexten P. F. Ogren

Feb. 3, 1948. S. P. F. OGREN 2,435,321
MACHINE TOOL
Filed Dec. 23, 1944 5 Sheets-Sheet 2

INVENTOR.
Sexten P. F. Ogren

INVENTOR.
Sexten P. F. Ogren
BY
his atty.

Patented Feb. 3, 1948

2,435,321

UNITED STATES PATENT OFFICE 2,435,321

MACHINE TOOL

Sexten P. F. Ogren, Rockford, Ill., assignor to Sundstrand Machine Tool Co., Rockford, Ill., a corporation of Illinois Application December 23, 1944, Serial No. 569,531

11 Claims. (Cl. 82—21)

This invention relates generally to machine tools and more particularly to a lathe, and its general object is to provide a machine tool having novel and improved means for materially increasing production by reason of its substantially automatic operation.

Another object of the invention is to provide a machine tool having a carriage reciprocable longitudinally thereof and carrying a transversely movable cross slide with novel and improved drive means for actuating the carriage and cross slide in a manner to provide tool relief with respect to traverse movement, both of the carriage and of the cross slide.

A further object of the invention is to provide a machine tool having a carriage, a cross slide and a common driving member therefor with separate driving connections controlling the movements of the carriage and cross slide respectively, including means to effect a slow down of the carriage before it stops, this means also being utilized to control a limited reverse movement of the carriage for the purpose of tool relief during movement of the cross slide.

It is also an object of the invention to provide a machine tool having a carriage, a cross slide and driving means for moving said carriage and cross slide automatically in a regular cycle, including mechanism by which a movement of the carriage for the purpose of tool relief is effected simultaneously with a return movement of the cross slide.

More specifically, it is an object of the invention to provide a machine tool having a carriage, a cross slide, a power driven screw with a traveler nut serving as a common driving means for the carriage and cross slide, together with a movable member on the carriage and a movable member on the nut interengageable to effect forward movement of the carriage and engageable in a different manner to permit limited reverse movement of the carriage, the movement serving as a tool relief movement following the completion of the feeding movement of the cross slide.

Other objects and advantages will become apparent from the following detailed description taken in connection with the accompanying drawings in which.

While the invention is susceptible of various modifications and alternative constructions, it is shown in the drawings and will be described hereinafter in a preferred embodiment and one modification, but it is not intended that the invention is to be limited thereby to the specific embodiments disclosed, and it is intended to cover all modifications and alternative constructions falling within the spirit and scope of the appended claims.

As disclosed herein the invention is shown embodied in a machine tool of the type known as a production lathe and comprising generally a bed 10 at one end of which is a head stock 11 in which there is journalled a spindle 12. The bed 10 is provided with a horizontal guideway 13 (see Fig. 3) and slidably mounted on the guideway for movement longitudinally of the lathe is a carriage 14 having a cross slide 15. Suitable power means (not shown) are provided for driving the spindle 12, the carriage 14 and the cross slide 15. The carriage 14 includes a horizontal portion 17 and a vertically depending portion 18 providing horizontal and vertical surfaces 19 and 20 respectively for sliding engagement with the guideway 13 and the supplemental guide surface 21 of the bed. The carriage also includes retaining portions 22 and 23 provided with the usual gibs 24 and 25 adjustable for securing a snug fit for the carriage on the bed in the conventional manner.

Figures 3, 4:
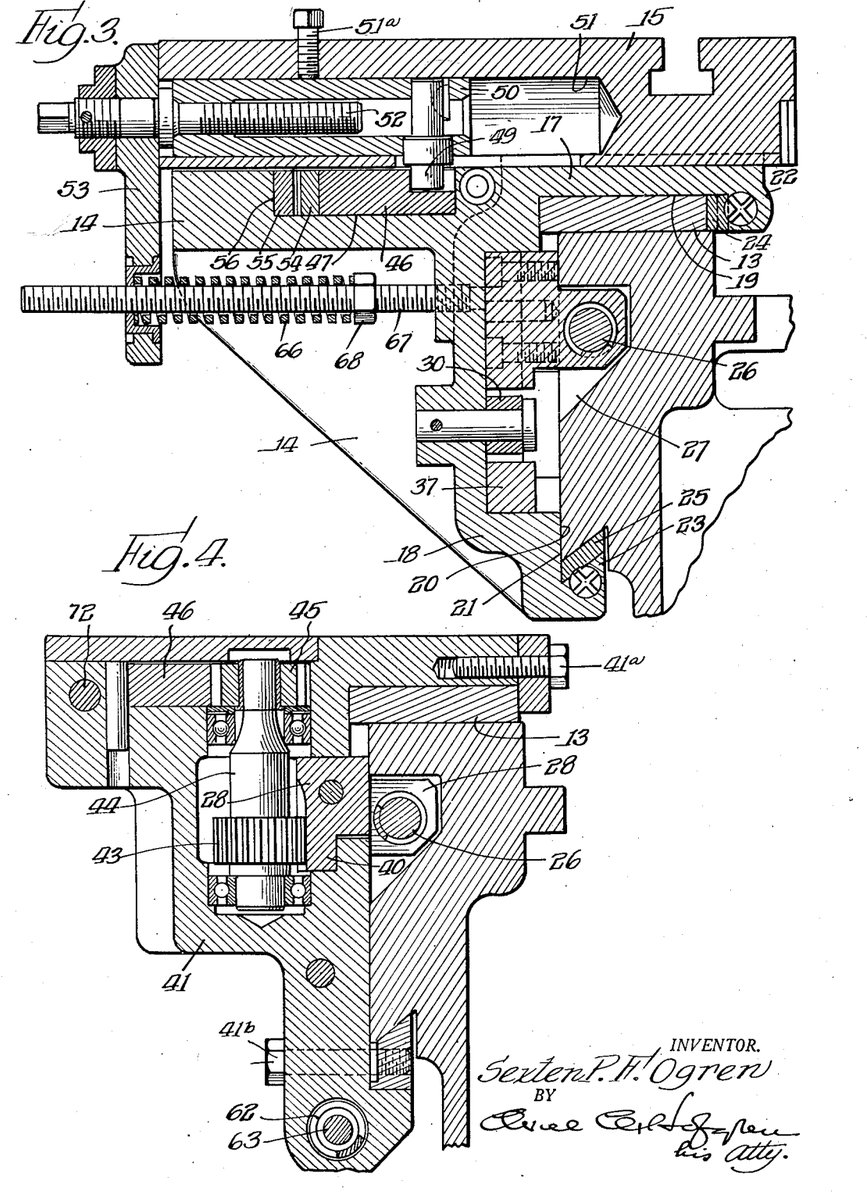
Fig. 3 is a transverse vertical section taken substantially as indicated at line 3—3 on Fig. 1.
Fig. 4 is a transverse vertical section taken substantially as indicated at line 4—4 on Fig. 2.

The power drive for the carriage and its cross slide includes a feed screw 26 extending longitudinally of the bed and accommodated in a recess 27 therein as seen in Figs. 3 and 4. This feed screw is reversibly driven by suitable gearing (not shown) and carries a traveler nut 28 which is accommodated partly in space provided in the rear face of the carriage apron 29 and partly in the longitudinal recess 27 of the bed of the lathe. The carriage 14 is provided with a pivoted dog 30 and the traveler nut 28 carries a slidably mounted block 31 having a limited range of longitudinal sliding movement between the end surfaces 32 and 33 of a pocket 34 formed in the body of the nut 28.

Figure 1:
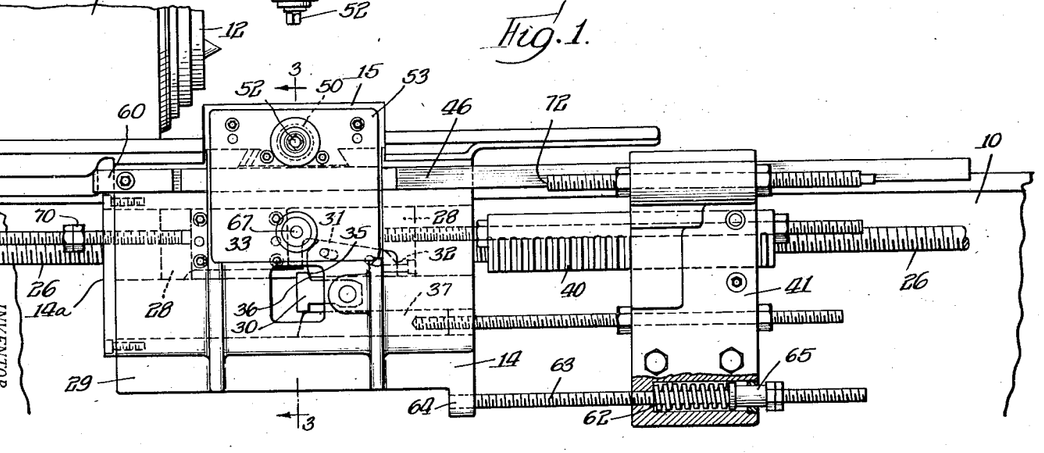
Fig. 1 is a fragmentary front elevation of a production lathe of the type to which this invention is applicable and showing particularly the carriage and tool slide thereon.
Figure 5:
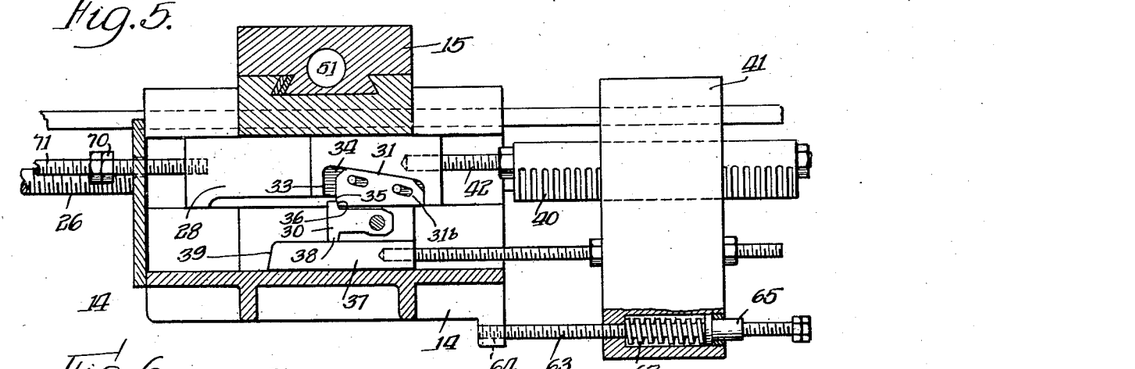
Fig. 5 is a somewhat diagrammatic elevational view illustrating the drive connection for the carriage in driving position.

For effecting the feeding movement of the carriage, which is the movement toward the head stock 11, the slightly inclined shoulder 35 of the block 31 engages the inclined shoulder 36 of the dog 30 as seen in Figs. 1 and 5. The dog is maintained in position for this engagement by riding along the upper surface of a fixed guide rail 37, and the feeding movement of the carriage continues until the bearing lug 38 of the dog 30 rides over the end of the guide rail 37. At this point the dog is no longer supported in driving position and the vertical component of the driving force between the inclined face 35 of the block 31 and the inclined shoulder 36 of the dog cams the dog downwardly so that its bearing lug 38 rides along the inclined end surface 39 of the guide rail 37. In other words, the separation of the dog 30 from the block 31 is not instantaneous but consumes an interval of time determined by the inclination of the surfaces 35, 36 and 39, and during the downward movement of the dog 30 about its pivot the carriage continues to travel, but at a reduced speed, until separation of the dog from the driving block 31 is effected. The carriage then stops but the nut 28 continues to travel for effecting the transverse movement of the cross slide 15.

For this purpose, a rack member 40 is slidably mounted in a bracket 41 which is adjustably secured in fixed position on the guideway 13 of the bed. The rack 40 is coupled to the nut 28 by means of a threaded tie rod 42 so that it travels through the bracket 41 whenever the nut 28 is fed in either direction by means of feed screw 26. A gear pinion 43 meshing with the rack 40 is carried on a shaft 44 disposed vertically and journalled in the bracket 41 as seen in Fig. 4. At its upper end, the shaft 44 carries a pinion 45 which meshes with gear teeth on a cam bar 46 which is slidably mounted in the bracket 41 and extends in substantially parallel relation to the bed 10. In the carriage 14 a guideway 47 is provided for the cam bar 46 and the bar is formed with a cam slot 48 engageable with a follower pin 49 which projects downwardly from the cross slide 15 as seen in Fig. 3 and also in Figs. 8 and 9.

For purposes of adjustment, the follower pin 49 is secured in a sleeve or barrel 50 slidable in a guideway 51 in the cross slide 15 and adjustable therein by means of a screw 52 which is captively journaled in the end plate 53 of the cross slide 15. A set screw 51$^a$ secures the sleeve or barrel at any position of adjustment so that the pin 49 is always rigidly associated with the cross slide.

Figures 9, 10:
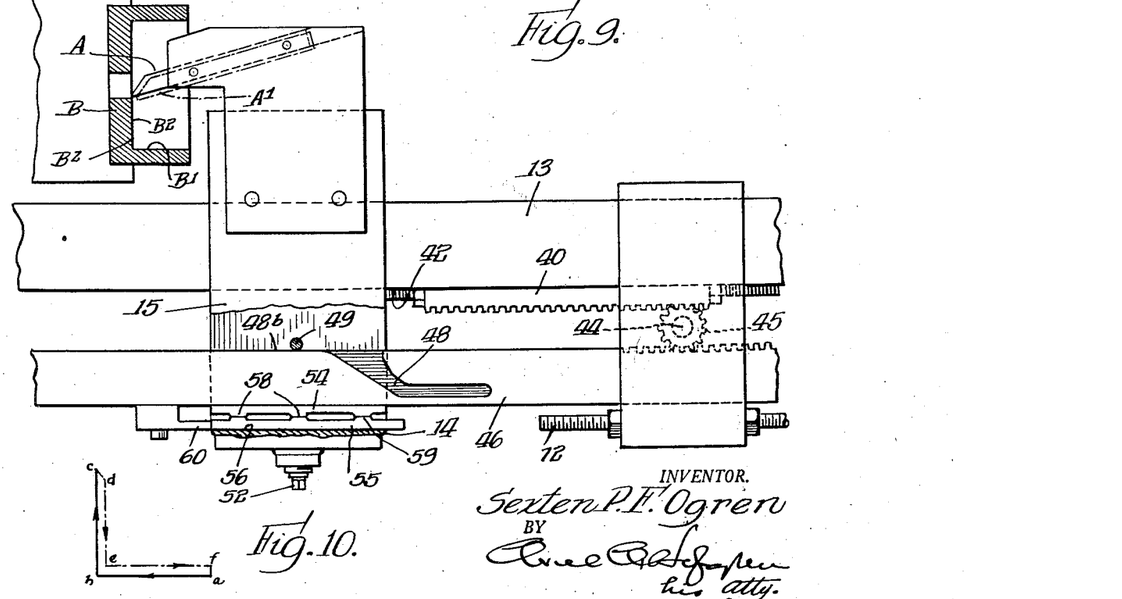
Fig. 9 is a diagram similar to Fig. 8 showing the parts in the position assumed at the end of the feeding movement of the tool slide and adjusted for tool relief.
Fig. 10 is a diagram indicating the operating cycle afforded by the movements indicated in Figs. 5 to 9 for providing two way tool relief.

Since the bracket 41 is anchored fixedly to the bed as by the clamp screws 41$^a$ and 41$^b$ the travel of the nut 28, carrying with it the rack bar 40, rotates the gear 43, shaft 44 and pinion 45, and with the arrangement shown this produces movement of the cam bar 46 in a direction opposite to that in which the nut 28 is traveling and at the same speed, since the gears 43 and 45 are of equal size; and the bracket 41 is so adjusted that when the feeding movement of the carriage is terminated by disengagement of the dog 30 from the block 31 the inclined face 48$^a$ of the cam slot 48 engages the pin 49 so that further rearward travel of the cam bar 46 drives the cross slide 15 inwardly to the extent indicated in Fig. 9. Thereafter, the longitudinal edge 48$^b$ of the cam bar 46 rides against the pin 49 for a short distance.

Figure 8:
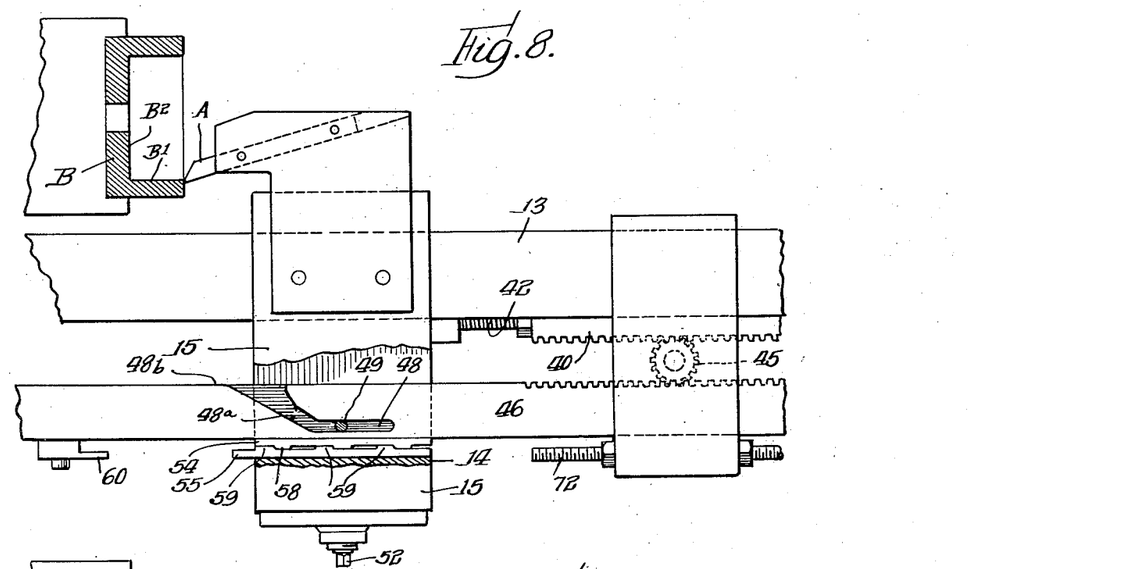
Fig. 8 is a diagrammatic top plan view showing the driving means for the tool slide, together with features for providing tool relief movement of said slide.

In the particular example illustrated in Figs. 8 and 9 the work piece B is a cylindrical cup-shaped member having a cylindrical surface B$^1$ and an end face B$^2$ representing the cuts to be made by the tool shown at A. The cut B$^1$ is completed in the feeding movement of the carriage during engagement of the dog 30 with the block 31 as already described. The surface B$^2$ is produced by the tool in its inward travel caused by the traverse of the follower pin 49 along the inclined face of the cam slot 48. The tool must then be returned to its initial starting point and tool relief must be provided with respect to both surfaces B$^1$ and B$^2$ to prevent the tool from scratching or marring them in its return travel. Tool relief with respect to the surface B$^1$ is accomplished at the completion of the inward feeding movement of the cross slide by the provision of a pair of bars 54 and 55 which are interposed between the outer or back side of the cam bar 46 and the vertical face 56 of the guideway 47 in the carriage 14. The bar 54 has a plurality of longitudinally spaced projections or pads 58 and the bar 55 has a series of spaced projections or pads 59 which normally intermember with the pads 58 as shown in Fig. 8. However, in the final movement of the cam bar 46 in which its edge 48$^b$ traverses the follower pin 49, a trip member 60, carried by the bar 46, strikes the end of the bar 55 and shifts it sufficiently to cause its pads 59 to ride onto the pads 58 of the bar 54 in registration therewith as shown in Fig. 9. This increases the total width of the space occupied by the bars 54 and 55, and since the face 56 of the guideway 47 is relatively fixed, being formed in the carriage 14, the increased dimension operates to shift the cam bar 46 transversely and to move the follower pin 49 and the cross slide 15 inwardly by an amount equal to the height or thickness of the pads 58. The point of the tool A is thus carried inwardly from the position in which it is shown in dotted lines at A$^1$ to the position shown in full lines in Fig. 9; and the feed screw 26 is then arrested and reversed.

Figure 7:
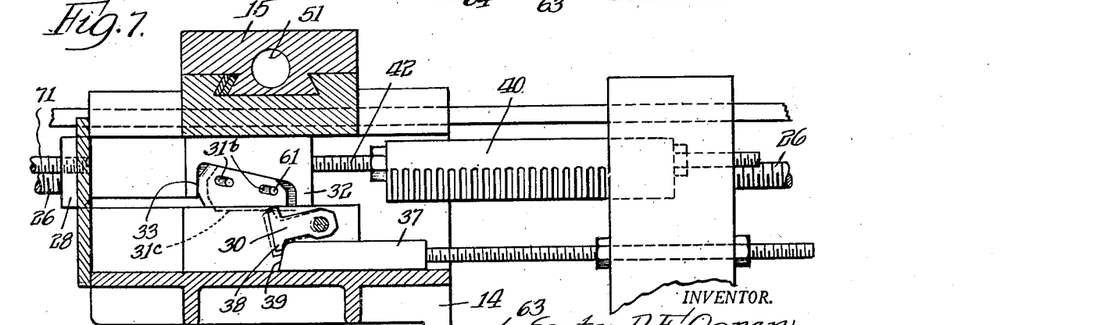
Fig. 7 is a diagram similar to Fig. 5 showing the carriage drive connection as positioned in the initial portion of return traverse of the carriage which provides tool relief movement of the carriage.

The first effect of the reverse travel of the feed screw 26 is to cause reverse movement of the traveler nut 28; but the friction between the dog 30 and the horizontal under face 31$^a$ of the block 31 causes the block to be held back during the initial movement of the nut 28. The block 31 is slidably engaged with the nut 28 by means of slots 31$^b$ and guide pins 61. The upper side of the pocket 34 and the contacting face of the block 31 are inclined to the direction of movement of the traveler nut 28 and the slots 31$^b$ are inclined in the same direction so that the frictional drag of the dog 30 against the lower face of the block 31 causes the block to shift in this inclined direction until it engages the end wall 33 of the pocket 34 as seen in Fig. 7. This movement simultaneously carries the block upward so that its lower edge is shifted from the position shown in dotted lines at 31$^c$ (see Fig. 7) to the position shown in full lines. This shifting of the block permits the dog 30 to rise a corresponding distance so that its lug 38 rides up along the inclined end 39 of the guide rail 37. This upward movement of the dog 30 is insured by a yielding pull of a spring 62 pocketed in the bracket 41 and coiled loosely around a rod 63 extending slidably through the bracket. The rod 63 is anchored at 64 in the carriage 14; hence it extends rigidly from the carriage and travels with it. During the final portion of the forward feeding movement of the carriage 14 a flanged sleeve 65 on the rod 63 compresses the spring 62 so that this spring exerts pressure tending to return the carriage 14 in the opposite direction when it is permitted to do so. The slight rise of the block 31 as it shifts in the pocket 34, as just described, permits the dog 30 to swing upward upon its pivot on the carriage 14 and to ride upwardly along the inclined end 39 of the guide rail 37; and because the surface 39 is inclined, this upward movement of the dog permits a short return movement of the carriage under stress of the spring 62. The extent of this movement is indicated by the difference between the dotted line position and the full line position of the dog 30 in Fig. 7, and of course this movement shifts the tool A away from the finished surface B$^2$ sufficiently to avoid any marring or scratching of the surface as the cross slide 15 travels outwardly toward its initial position. In other words, this movement afforded by the return travel of the dog 30 along the inclined surface 39 provides the tool relief for the transverse movement of the tool.

Continued reverse rotation of the feed screw 26 moves the nut 28 with respect to the carriage 14 and shifts the rack 40 in reverse direction, thus causing an opposite movement of the cam bar 46. The cross slide 15 is yieldingly urged outward by means of a spring 66, shown in Fig. 3, coiled about a threaded rod 67 which projects from the carriage 14 directly below the cross slide 15. The spring 66 reacts between a nut 68 on rod 67 and the depending end plate 53 of the cross slide 15 thus constantly exerting a pressure tending to move the slide outwardly and operating to shift the follower pin 49 into the cam slot 48 as the cam bar 46 is fed in its reverse direction. Thus, a return movement of the cross slide 15 is effected and this movement is equal to its original feeding movement, but is displaced by the amount of the tool relief accomplished by shifting of the bars 54 and 55 as described. When this return movement of the cross slide has been completed, the return of the carriage to its starting point is accomplished by engagement of a nut 70 on the threaded rod 71 extending rigidly from the traveler nut 28 in position to abut the end wall 14$^a$ of the carriage 14 so as to propel the carriage in reverse direction to its starting point. Just before this limit of the movement is reached an adjustable stop rod 72, extending from the bracket 41, engages the end of the bar 55 and shifts the latter back to its initial position, as shown in Fig. 8, so that the pads 58 and 59 are again disposed in alternating positions permitting the spring 66 to force the carriage 14 outwardly, bringing the tool A into its initial cutting position ready for forward traverse of the carriage after a new work piece has been inserted in the chuck of the machine.

Figure 2:
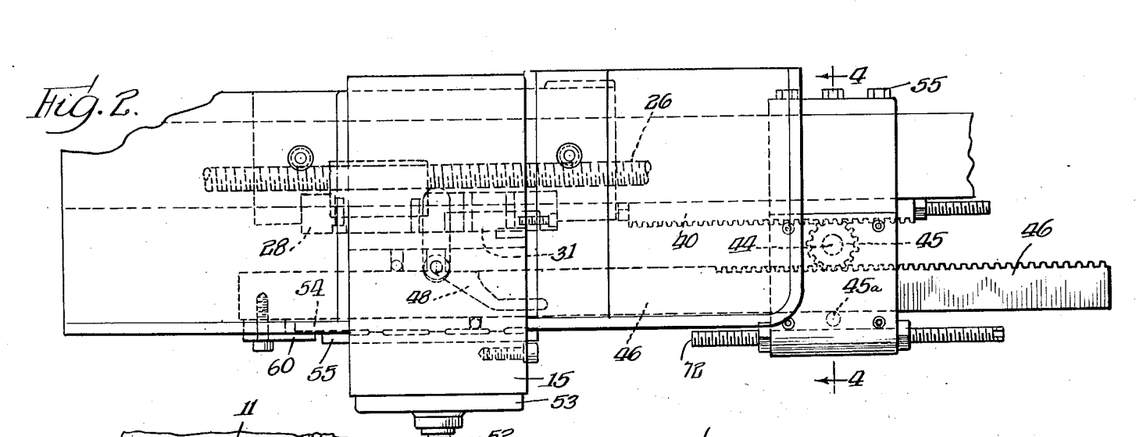
Fig. 2 is a partial plan view showing principally the carriage and tool slide illustrated in Fig. 1.

With reference to the operation of the bars 54 and 55 which serve to shift the cross slide for the purpose of tool relief, it may be noted that although in the position shown in Fig. 9 the effect of the bars is to move the adjacent end of the cam bar 46 slightly out of its original position, this does not require any strain or bending of the cam bar. Said bar 46, as shown in Fig. 2, has its teeth engaged with the pinion 45 and the opposite edge of the bar is held in position only by a pin 45$^a$ fixed in the bracket 41. This arrangement readily permits a very slight misalignment of the bar which results from the shifting of the portion remote from the pinion 45 when the bars 54 and 55 are positioned as shown in Fig. 9.

Fig. 10 shows diagrammatically the movement of the cutting point of the tool A under control of the mechanism described for affording relief in two directions. The traverse of the carriage 14 produces the cutting stroke $ab$ along the surface B$^1$ of the work piece B. Movement of the cross slide 15 carries the tool from $b$ to $c$, finishing the surface B$^2$ of the work piece and carrying the tool slightly farther in response to shifting of the bar 55. Simultaneous reversal of the cross slide 15 and the initial reverse travel of the carriage 14 under control of the dog 30 and sliding block 31 produces the diagonal movement from $c$ to $d$. Thereafter, the carriage is arrested until the cross slide has brought the tool to $e$; then the reverse travel of the carriage is resumed to return the tool to $f$, and at the conclusion of this movement the shifting of the bar 55 by the stop rod 72 moves the tool from $f$ to $a$. Fig. 10 is drawn at double scale.

Figure 11:
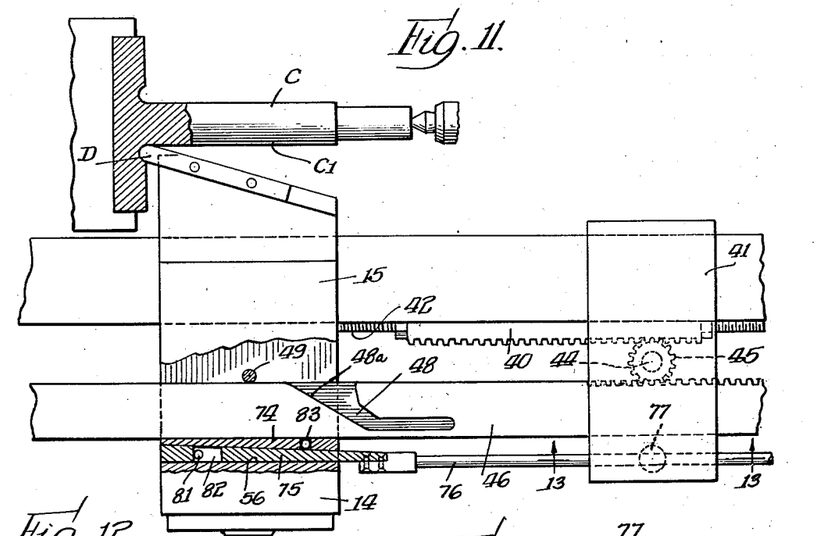
Fig. 11 is a fragmentary plan view showing a modified structure for providing tool relief in respect to the tool slide movement and showing the carriage and slide at the completion of the carriage feed traverse.
Figures 12, 13, 14:
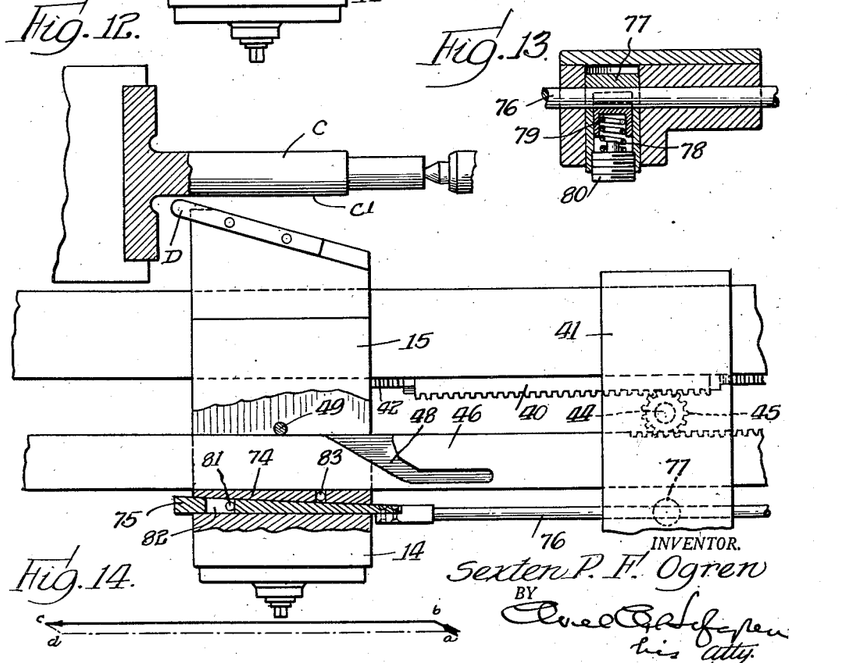
Fig. 12 is a plan view similar to Fig. 11 but showing parts at the commencement of return traverse of the carriage and with the tool relief device in operative position.
Fig. 13 is a detail section taken as indicated at line 13—13 on Fig. 11.
Fig. 14 is a diagram of the tool cycle secured with the structure shown in Figs. 11 to 13.

Figs. 11, 12 and 13 represent somewhat diagrammatically a modified arrangement for securing a tool relief movement of the cross slide automatically and at the proper time in the cycle of operation. A wedge bar 74 is paired with an oppositely tapered wedge bar 75 and these wedges are positioned between the back or outer edge of the cam bar 46 and the vertical face 56 of the channel in the carriage 14 in which the cam bar 46 is accommodated. A rod 76 is connected to the wedge 75 and passes through a friction brake device carried in the bracket 41. This device, as shown in Fig. 13, comprises a cylinder 77 within which there is pocketed a coil spring 78 reacting between a brake shoe 79 and a threaded plug 80 secured in one end of the cylinder 77. The brake shoe thus exerts a constant frictional drag upon the rod 76 so that during the initial movement of the carriage in either direction the rod 76 and the wedge 75 are held back, causing relative movement between the wedge 75 and the carriage 14. In the example illustrated in Figs. 11 and 12, Fig. 11 shows the work piece C with the tool D at the end of its feeding movement after having just completed the cylindrical surface C$^1$. Upon reversal of the carriage 14 the drag of the friction brake 79 on the rod 76 holds the rod stationary during the initial movement of the carriage 14 until the stop pin 81 in the carriage has traveled the length of the notch 82 in the lower face of the wedge 75. This brings the wedges 74 and 75 to the relative positions shown in Fig. 12, reducing their combined thickness by a small amount and permitting the spring 66 (see Fig. 3) to force the cross slide 15 outwardly by this amount thus providing tool relief to the extent of this movement, as indicated in Fig. 12. Continued travel of the carriage 14 in reverse direction forces the rod 76 through the brake device in opposition to the shoe 79. Then, upon reversal of the carriage 14 for its next feeding movement the rod 76 is again arrested by the friction of the brake device, allowing the carriage 14 to travel relatively to the wedge 75 but carrying with it the wedge 74 which is held in fixed relation to the carriage by a pin 83. This continues until the pin 81 has traveled from one end of the notch 82 to the other end, as shown in Fig. 11, so that the combined thickness of the wedges 74 and 75 is increased by an amount sufficient to take up the tool relief and bring the tool D back to its normal cutting position for operating upon a new work piece.

Figure 6:
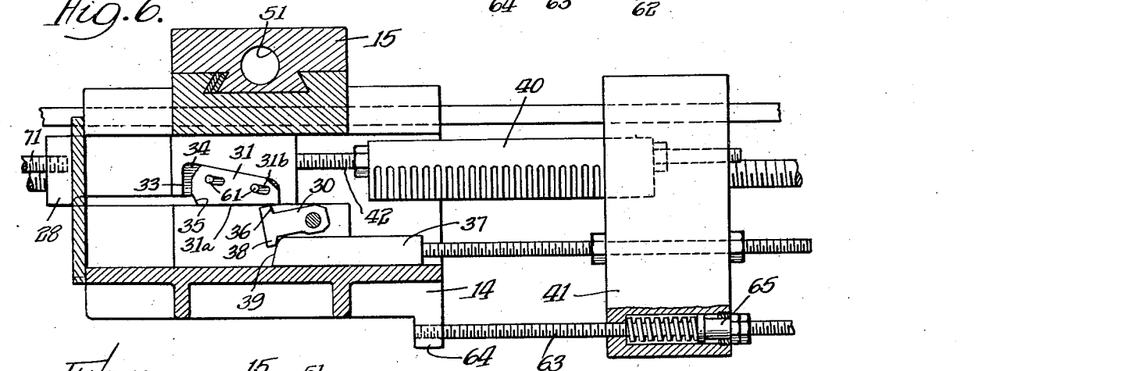
Fig. 6 is a diagram similar to Fig. 5 showing the drive connection for the carriage at inoperative or delay position at the end of the carriage traverse in forward direction.

It may be noted that the operation illustrated in Figs. 11 and 12 involves only the finishing of a single cylindrical surface, but it will be readily understood that if desired the traverse movement of the carriage 14 may be combined with a transverse movement of the cross slide 15 controlled by the cam bar 46 in the manner already described and that tool relief in respect to the movement of the cross slide will be afforded by the operation of the dog 30 and sliding block 31 as fully illustrated in Figs. 5, 6 and 7. In other words, the pair of wedges 74 and 75 and their controlling brake may be substituted for the bars 54 and 55 for all purposes for which said bars are employed.

Fig. 14 illustrates diagrammatically the movement of the tool D under control of the wedges 74 and 75 in the example illustrated in Figs. 11 and 12. Starting at $a$, the tool is carried diagonally to $b$ by the combination of movements produced by the travel of the carriage 14 and the shifting of the wedge 75 from the position shown in Fig. 12 to the position shown in Fig. 11. The tool then travels from $b$ to $c$ for finishing the surface C. Then, upon reversal of the carriage 14 the tool is withdrawn along the diagonal line $cd$ by the combination of the reverse movement of the carriage and the shifting of the wedge 75 to the position shown in Fig. 12. Thereafter, the continued reverse movement of the carriage carries the tool from $d$ to $a$. As already noted these movements may be combined in a cycle which includes movement of the tool for working upon a transverse surface, in which event additional tool relief would be afforded by operation of the dog 30 and block 31 as previously described. For the sake of clarity the diagram of Fig. 14 is drawn at twice the scale of Figs. 11 and 12.

I claim as my invention:

1. In a machine tool having a bed, a carriage reciprocably mounted on the bed, a cross slide on the carriage, a reversible driving member common to the cross slide and carriage, a driving connection from said member to the carriage, including a traveler movable longitudinally of the bed, a block carried by said traveler and mounted for limited movement thereon, said block having a shoulder, a dog movably mounted on the carriage and formed to engage the shoulder of the block for driving the carriage forward, a fixed guide bar slidably contacting the dog to maintain its engagement with the block, said dog riding off the main guide surface of said bar and thus becoming disengaged from the block and terminating the forward travel of the carriage before termination of the forward movement of said traveler, and means actuated by the traveler to effect the transverse feeding movement of the cross slide after completion of the forward travel of the carriage, the reversal of the traveler causing said limited relative movement of the block and permitting the dog to ride in reverse direction along a surface of the guide bar to control an initial reversal of the carriage to provide tool relief during return travel of the cross slide resulting from the reversal of the traveler.

2. In a machine tool having a bed, a carriage reciprocably mounted on the bed, a cross slide on the carriage, a reversible driving member, a driving connection from said member to the carriage, including a traveler movable longitudinally of the bed, a block carried by said traveler and mounted for limited movement thereon, said block having a shoulder, a dog movably mounted on the carriage and formed to engage the shoulder of the block for driving the carriage forward, a fixed guide bar slidably contacting the dog to maintain its engagement with the block, said dog riding off the main guide surface of said bar and thus becoming disengaged from the block and terminating the forward travel of the carriage before termination of the forward movement of said traveler, said block during completion of its forward travel riding over the dog and holding it in contact with an end surface of the guide rail, means feeding the cross slide transversely during the forward movement of the traveler and returning said cross slide during reverse movement of said traveler, and means whereby reverse travel of the carriage driving connection shifts the block to a position permitting movement of the dog and limited reverse movement of the carriage providing tool relief during return travel of the cross slide.

3. In a machine tool having a bed, a carriage reciprocably mounted on the bed, a cross slide on the carriage, a reversible driving member, a driving connection from said member to the carriage, including a traveler movable longitudinally of the bed, a block carried by said traveler and mounted for limited movement thereon, said block having a shoulder, a dog movably mounted on the carriage and formed to engage the shoulder of the block for driving the carriage forward, a fixed guide bar slidably contacting the dog to maintain its engagement with the block, said dog riding off the main guide surface of said bar and thus becoming disengaged from the block and terminating the forward travel of the carriage before termination of the forward movement of said traveler, said block during completion of its forward travel riding over the dog and holding it in contact with an inclined end surface of the guide rail, means feeding the cross slide transversely during the forward movement of the traveler and returning said cross slide during reverse movement of said traveler, and means whereby reverse travel of the carriage driving connection shifts the block to a position permitting movement of the dog along said inclined end surface and limited reverse movement of the carriage providing tool relief during return travel of the cross slide.

4. In a machine tool as defined in claim 3, yielding means urging the dog in reverse direction along said inclined end surface of the guide bar and serving to drive the carriage in its limited reverse movement when permitted to do so upon shifting of the block, said block having an inclined portion for guiding it in an oblique path for movement both longitudinally and vertically, so that frictional drag between the dog and the block upon reversal of movement of the driving member moves the block on said inclined portion to allow said limited reverse movement of the carriage.

5. In a machine tool as defined in claim 3, a bracket anchored to the bed, a member fixed to the carriage and extending slidably through said bracket, a stop shoulder on said member and a spring which is compressed between said shoulder and the bracket during forward travel of the carriage, said spring urging the dog in reverse direction along said inclined end surface of the guide bar and serving to drive the carriage in its limited reverse movement when permitted to do so upon shifting of the block, said block having an inclined portion for guiding it in an oblique path for movement both longitudinally and vertically, so that frictional drag between the dog and the block upon reversal of movement of the driving member moves the block on said inclined portion to allow said limited reverse movement of the carriage.

6. In a machine tool having a bed, a carriage reciprocably mounted thereon, a cross slide on the carriage, driving means comprising a reversible feed screw, a traveler nut on said screw, a block carried by said nut having a limited sliding movement longitudinally of the nut, a dog pivoted on the carriage having a shoulder engageable by a shoulder of said block to establish a forward driving connection between the nut and the carriage, and a fixed guide bar having a surface extending parallel to the feed screw slidably engaging said dog to maintain its engagement with the block, said surface of the bar ending at an inclined shoulder and the driving shoulder of said block being inclined in a direction to cam the dog out of driving engagement and along said inclined shoulder of the guide bar, said block having a longitudinal surface parallel to the screw which rides on the dog after said disengagement as the nut continues to travel forward, means whereby the cross slide is fed transversely of the direction of carriage movement, said block being slidable upon the nut in a direction slightly inclined to the axis of the nut, and means yieldingly urging the carriage in reverse direction and thus pressing the dog against said surface of the block and against the inclined shoulder of the guide bar, whereby upon reversal of the feed screw and nut the dog frictionally holds the block while the inclined sliding movement of the block on the nut causes the block to withdraw, permitting the dog to be returned along the inclined shoulder of the guide bar, thus producing limited reverse travel of the carriage which affords tool relief.

7. In a machine tool, in combination with a bed, a carriage movable longitudinally thereon, and a cross slide movable on said carriage, resilient means urging the slide toward its withdrawn position, means opposing said resilient means comprising a pair of oppositely tapered wedges disposed face to face and interposed between opposed shoulders movable with the carriage and slide respectively, and a member extending longitudinally from one wedge together with a friction brake device disposed in fixed relation to the machine bed and bearing against said member and resisting movement of said wedge at the commencement of travel of the carriage in either direction, thereby shifting one wedge upon the other to cause movement of the slide on the carriage.

8. In a machine tool as defined in claim 7, stop means on the carriage limiting the extent of shifting movement of the wedge and forcing the member extending therefrom to overcome the resistance of the friction brake and move thereafter with the carriage until reversal thereof.

9. In a machine tool, in combination with a bed, a carriage movable longitudinally thereon and a cross slide movable on said carriage, resilient means urging the slide toward its withdrawn position, a cam bar extending along the path of the carriage, a follower carried on said slide operating to move the latter in response to relative movement of the slide and cam bar in opposition to the resilient means, a pair of oppositely tapered wedges disposed face to face and interposed between a shoulder on the carriage and one side of the cam bar, a member extending longitudinally from one of said wedges and a friction brake device disposed in fixed relation to the machine bed and including a friction shoe bearing against said member with a spring holding said shoe in contact therewith for resisting movement of the wedge at the commencement of return travel of the carriage, thereby shifting one wedge upon the other to alter their combined thickness, thus causing limited movement of the cam bar with its follower and the slide attached thereto to provide tool relief during return travel of the carriage.

10. In a machine tool having a bed, a carriage reciprocably mounted on the bed, a cross slide on the carriage, a reversible driving member common to the cross slide and carriage, a driving connection from said driving member to said carriage including disengageable means for disconnecting said carriage from the driving member after a predetermined forward movement, and an independent driving connection from said driving member operable to move the cross slide transversely of the direction of carriage movement, means associated with the driving member and carriage whereby said disengageable carriage driving connection effects a limited reverse movement of the carriage upon reversal of said common driving member to provide tool relief during the return travel of the cross slide resulting from such reversal of the driving member, a pair of relatively movable parts positioned between opposed shoulders movable with the carriage and slide respectively, said parts having portions interengageable to hold the tool slide at a given position relative to its said driving connection and disengageable by disposal in intermembering relation to permit a slight movement of the cross slide relative to said driving connection, said parts being so intermembered during the cutting movement of the tool slide, and means actuated by said driving connection upon completion of said cutting movement to shift one of said parts into position for engagement of its interengageable portions, thereby affording tool relief during the return travel of the carriage upon reversal of the driving member, said means associated with the driving member and carriage comprising an obliquely slidable member on the driving member which moves longitudinally and vertically upon reversal of movement of the driving member to permit spring action to cause the carriage to have said limited reverse movement.

11. In a machine tool having a bed, a carriage, a cross slide, a reversible driving member common to the cross slide and carriage and having a traveller, a dog movably mounted on the carriage, and a block slidably mounted on said traveller, said block having an inclined surface, said traveller having means coacting with said inclined surface to enable the block to have both a longitudinal and vertical movement along the body of the traveller for controlling the operation of the dog and carriage.

SEXTEN P. F. OGREN.

REFERENCES CITED

The following references are of record in the file of this patent:

UNITED STATES PATENTS

| Number | Name | Date |
|---|---|---|
| 2,206,886 | Granberg | July 9, 1940 |